(12) United States Patent
Hopper et al.

(10) Patent No.: US 8,056,246 B1
(45) Date of Patent: Nov. 15, 2011

(54) FERROFLUIDIC ORIENTATION SENSOR AND METHOD OF FORMING THE SENSOR

(75) Inventors: Peter J. Hopper, San Jose, CA (US); William French, San Jose, CA (US); Ann Gabrys, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 12/838,655

(22) Filed: Jul. 19, 2010

(51) Int. Cl.
*G01C 9/06* (2006.01)
(52) U.S. Cl. ............... 33/366.11; 33/366.15; 33/366.25
(58) Field of Classification Search ............... 33/366.11, 33/366.16, 366.25, 366.26
See application file for complete search history.

(56) References Cited

U.S. PATENT DOCUMENTS

| | | | |
|---|---|---|---|
| 4,667,414 A * | 5/1987 | Russell | 33/355 R |
| 4,672,753 A * | 6/1987 | Kent et al. | 33/366.19 |
| 5,168,221 A * | 12/1992 | Houston | 33/1 M |
| 5,632,093 A * | 5/1997 | Elias | 33/366.25 |
| 5,703,484 A * | 12/1997 | Bieberdorf et al. | 33/366.14 |
| 5,780,741 A * | 7/1998 | Raj | 73/514.08 |
| 6,062,081 A | 5/2000 | Schendel | |
| 6,449,857 B1 * | 9/2002 | Anikolenko | 33/366.11 |
| 7,188,426 B2 * | 3/2007 | Barr | 33/366.19 |
| 7,543,497 B2 | 6/2009 | Balogh | |
| 2008/0047154 A1 * | 2/2008 | Steinich | 33/366.17 |
| 2010/0186246 A1 * | 7/2010 | Steinich et al. | 33/396 |

OTHER PUBLICATIONS

Ando et al., "Innovative Ferrofluidic Inertial Sensor exploiting the Rosensweig effect", I2MTC International Instrumentation and Measurement Technology Conference, May 5-7, 2009, pp. 1419-1422 (unnumbered).
Ando et al., "FF_Sim: A Simulation tool for ferrofluidic transducers", 12th IMEKO TC1 & TC7 Joint Symposium on Man Science & Measurement, Sep. 3-5, 2008, pp. 401-406.
Ando et al., "Resonant Ferrofluidic Inclinometers: New Sensing Strategies", IEEE Sensors Conference, 2008, pp. 1179-1182.
Ando et al., "Behavior Analysis of a Ferrofluidic Gyroscope Performances", Procedia Chemistry 1, 2009, pp. 116-119.
Ando et al. "Advanced Educational Tools in Measurement and Sensors: from remote monitoring systems to magnetic fluids", International Journal of Education and Information Technologies, Issue 1, vol. 3, 2009, pp. 75-84.
Olaru et al., "Inductive tilt sensor with magnets and magnetic fluid", Sensors and Actuators A 120, 2005, pp. 424-428.

* cited by examiner

*Primary Examiner* — G. Bradley Bennett
(74) *Attorney, Agent, or Firm* — Mark C. Pickering

(57) ABSTRACT

An orientation sensor includes a measure of ferrofluid that moves as the orientation sensor moves. The movement of the ferrofluid, which lies over a number of coils, alters the magnetic permeability of the flux path around each coil. The orientation sensor determines a change in orientation by measuring a change in the voltage across each coil. The voltage across each coil changes as the inductance changes which, in turn, changes as the magnetic permeability of the flux path changes.

20 Claims, 17 Drawing Sheets

US 8,056,246 B1

FERROFLUIDIC ORIENTATION SENSOR AND METHOD OF FORMING THE SENSOR

BACKGROUND OF THE INVENTION

1. Field of the Invention

The present invention relates to an orientation sensor and, more particularly, to a ferrofluidic orientation sensor and a method of forming the sensor.

2. Description of the Related Art

An orientation sensor is a device for measuring changes in orientation. Orientation, in turn, is a description of the position of a body in space relative to a frame of reference. In a three dimensional frame of reference, measuring a change in orientation is a measure of the change in position of a body from a starting position within the frame of reference.

In a two dimensional frame of reference, measuring a change in orientation, which is also known as tilt, is a measure of the change in position of a reference plane from a starting position within the frame of reference. Tilt is commonly used to indicate the pitch and roll of aircraft and ships, or to measure the slope angle of a surface.

Further, as a body moves through space from one position to another position, the body moves with a velocity (a speed and direction). Acceleration and deceleration, in turn, are changes in the velocity of a body. Thus, the description of a body in space includes the orientation of the body along with the velocity and acceleration or deceleration of the body.

BRIEF DESCRIPTION OF THE DRAWINGS

FIG. 1A is a plan view of ferrofludic orientation sensor 100, while FIG. 1B is a cross-sectional view taken along line 1B-1B of FIG. 1A.

FIG. 2A is a plan view of detection structure 118, while FIG. 2B is a cross-sectional view taken along line 2B-2B of FIG. 2A.

FIG. 3A is a plan view of detection structure 118, while FIG. 3B is a cross-sectional view taken along line 3B-3B of FIG. 3A.

FIG. 4A is a plan view of detection structure 118, while FIG. 4B is a cross-sectional view taken along line 4B-4B of FIG. 4A.

FIGS. 6A and 6B are cross-sectional views taken along line 4B-4B of FIG. 4A.

FIG. 7A is a plan view of ferrofluidic orientation sensor 700, while FIG. 7B is a cross-sectional view taken along line 7B-7B of FIG. 7A.

FIG. 10A is a plan view of ferrofluidic orientation sensor 1000, while FIG. 10B is a cross-sectional view taken along line 10B-10B of FIG. 10A.

DETAILED DESCRIPTION OF THE INVENTION

Figure 1A:
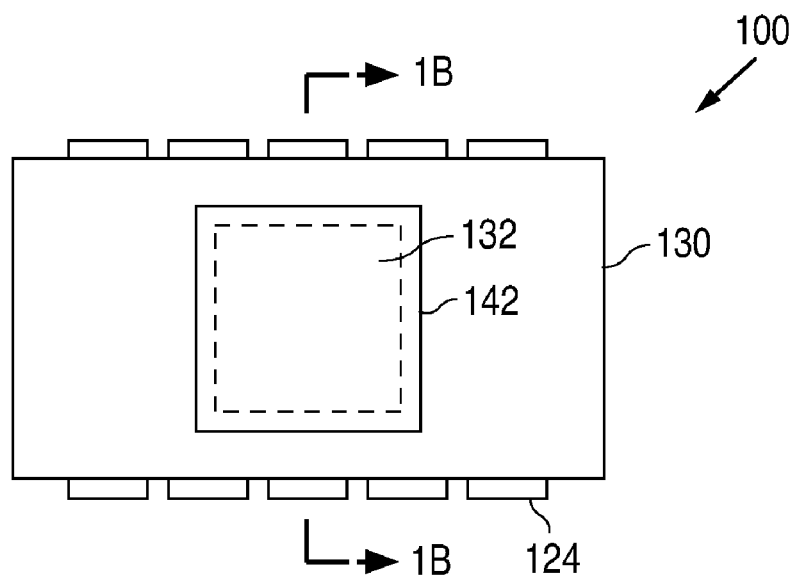
FIGS. 1A-1B are views illustrating an example of a ferrofludic orientation sensor 100 in accordance with the present invention.
Figure 1B:
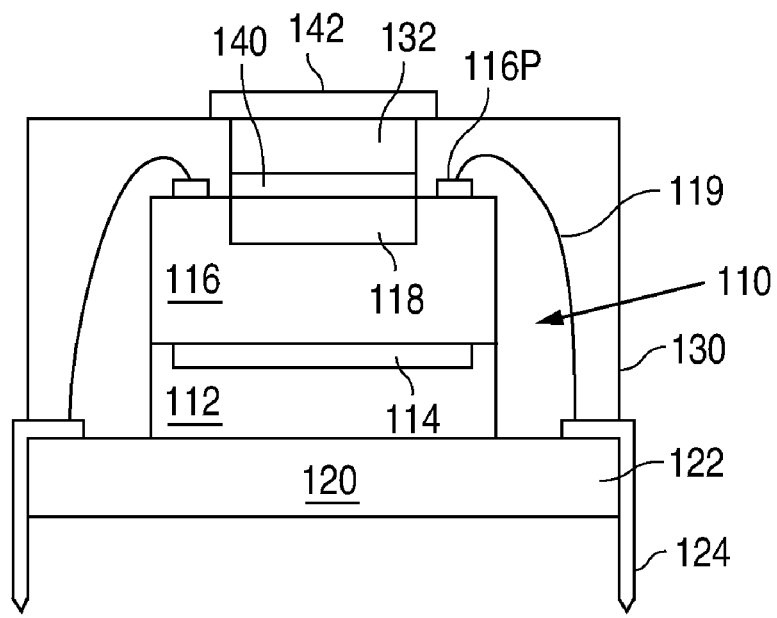

FIGS. 1A-1B show views that illustrate an example of a ferrofludic orientation sensor 100 in accordance with the present invention. FIG. 1A shows a plan view of ferrofludic orientation sensor 100, while FIG. 1B shows a cross-sectional view taken along line 1B-1B of FIG. 1A. As described in greater detail below, the orientation sensors of the present invention include a measure of ferrofluid that moves as the orientation sensor moves.

The movement of the ferrofluid, which lies over a number of coils, alters the magnetic permeability of the flux path around each coil. The orientation sensor determines a change in orientation by measuring a change in the voltage across each coil. The voltage across each coil changes as the inductance changes which, in turn, changes as the magnetic permeability of the flux path changes.

As shown in FIGS. 1A-1B, orientation sensor 100 includes a sensor die 110 that measures a change in orientation. Sensor die 110 includes a conventional substrate 112, a sensor structure 114 that touches substrate 112, a metal interconnect structure 116 that touches the substrate 112 and sensor structure 114, and a detection structure 118 that touches metal interconnect structure 116.

Sensor structure 114 includes a large number of electronic devices, such as transistors and resistors, while metal interconnect structure 116 electrically connects together the electronic devices in sensor structure 114 to realize a sensor circuit. Metal interconnect structure 116 includes levels of metal traces, a large number of contacts that connect the bottom metal traces to the electronic devices in sensor structure 114, a large number of inter-metal vias that connect the metal traces in adjacent layers together, and a number of pads 116P connected to the top metal traces that provide external electrical connection points. Detection structure 118, in turn, includes a large number of coil structures that are electrically connected to the electronic devices in sensor structure 114 by way of metal interconnect structure 116.

As further shown in FIGS. 1A-1B, orientation sensor 100 also includes bonding wires 119, and a lead frame 120 that is physically attached to the bottom surface of substrate 112 of sensor die 110, and electrically connected to metal interconnect structure 116 by way of the bonding wires 119. Lead frame 120 can be implemented with any conventional lead frame, including lead frames with pins or surface mount pads, which can be physically attached to the bottom surface of substrate 112 of sensor die 110, and electrically connected to metal interconnect structure 116.

In the present example, lead frame 120 includes a base 122, and a number of pins 124 that are connected to base 122. During fabrication, the bottom surface of substrate 112 is attached to base 122 with conventional conductive or non-conductive die attach adhesives using a conventional tool, such as a pick and place machine. Following this, the bonding wires 119 are electrically connected to the pads 116P of metal interconnect structure 116 and the pins 124 in a conventional manner.

Orientation sensor 100 additionally includes a body 130 that is attached to sensor die 110 and lead frame 120. As shown in FIGS. 1A-1B, body 130 includes an opening 132 that exposes the top surface of detection structure 118. As a result, body 130 encapsulates all of sensor die 110 and the bonding wires 119 except for the portion of sensor die 110 that is exposed by opening 132. During fabrication, body 130 is attached to sensor die 110 and lead frame 120 in a conventional manner using, for example, a conventional injection molding process.

Further, orientation sensor 100 includes a measure of ferrofluid 140 and a cover 142. As shown in FIG. 1B, ferrofluid 140 lies in opening 132 and only partially fills up opening 132. Cover 142, in turn, is attached to body 130 over opening 132 to enclose opening 132 and prevent ferrofluid 140 from escaping. During fabrication, ferrofluid 140 is inserted into opening 132 with a conventional tool that can place a defined amount of fluid on a semiconductor surface. In addition, cover 142 is attached to body 130 with conventional adhesives using a conventional tool, such as a pick and place machine.

Ferrofluid 140 is implemented with a conventional ferrofluid, which is a mixture of very small (e.g., 10 nm) magnetic particles (of an iron compound) that are evenly suspended in a fluid, such as water or an organic solvent, by thermal agitation. The magnetic particles are coated to prevent agglomeration. Ferrofluids are commercially available, such as from FerroTec (http://www.ferrotec.com/technology/ferrofluid/.)

Ferrofluids begin to change from a liquid state to a deformable solid state when exposed to a magnetic field that has a magnitude equal to a minimum value, and completely change from a liquid state to a deformable solid state when the magnitude of the magnetic field is increased from the minimum value to a solid state value.

Thus, the solid state value causes all of a measure of ferrofluid to change into a solid state, whereas a values less than the solid state value does not cause all of the measure of ferrofluid to change into a solid state. In addition, ferrofluids return to a liquid state without retaining magnetization when the magnitude of the magnetic field is reduced to a level that lies below the minimum value.

In orientation sensor 100, ferrofluid 140 is continuously free flowing, where continuously free flowing is defined to mean that ferrofluid 140 is never subjected to a magnetic field which is strong enough to cause ferrofluid 140 to begin to change states, i.e., ferrofluid 140 is never subjected to a magnetic field with a magnitude that is equal to or greater than the minimum value.

Thus, in orientation sensor 100, no permanent magnet with a magnetic field that is equal to or greater than the minimum value touches sensor die 110, lead frame 120, body 130, ferrofluid 140, or cap 142. In addition, no electromagnet that touches sensor die 110, lead frame 120, body 130, ferrofluid 140, or cap 142 generates a magnetic field with a magnitude that is equal to or greater than the minimum value.

Figure 2A:
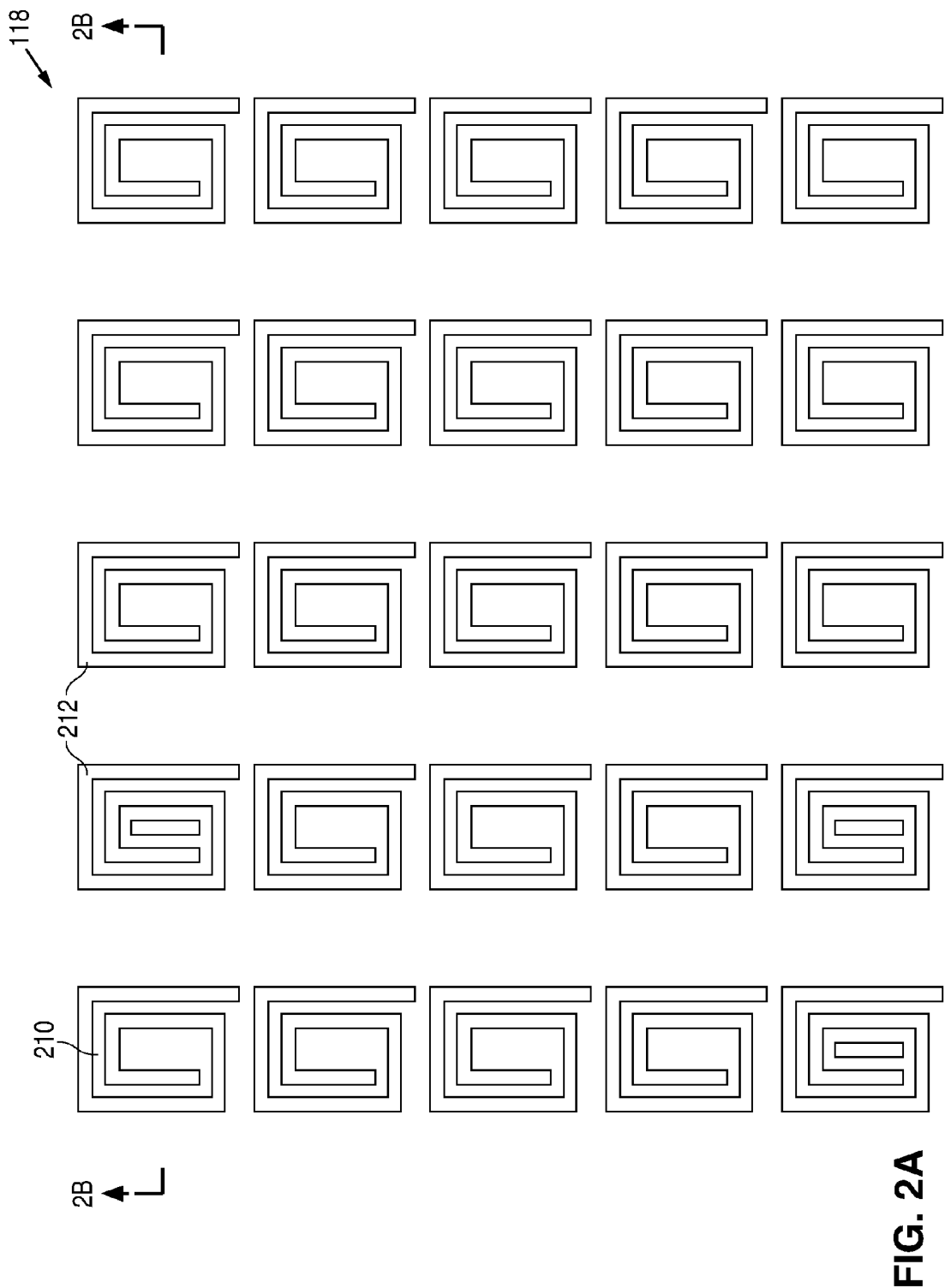
FIGS. 2A-2B are views illustrating an example of detection structure 118 in accordance with a first embodiment of the present invention.
Figure 2B:
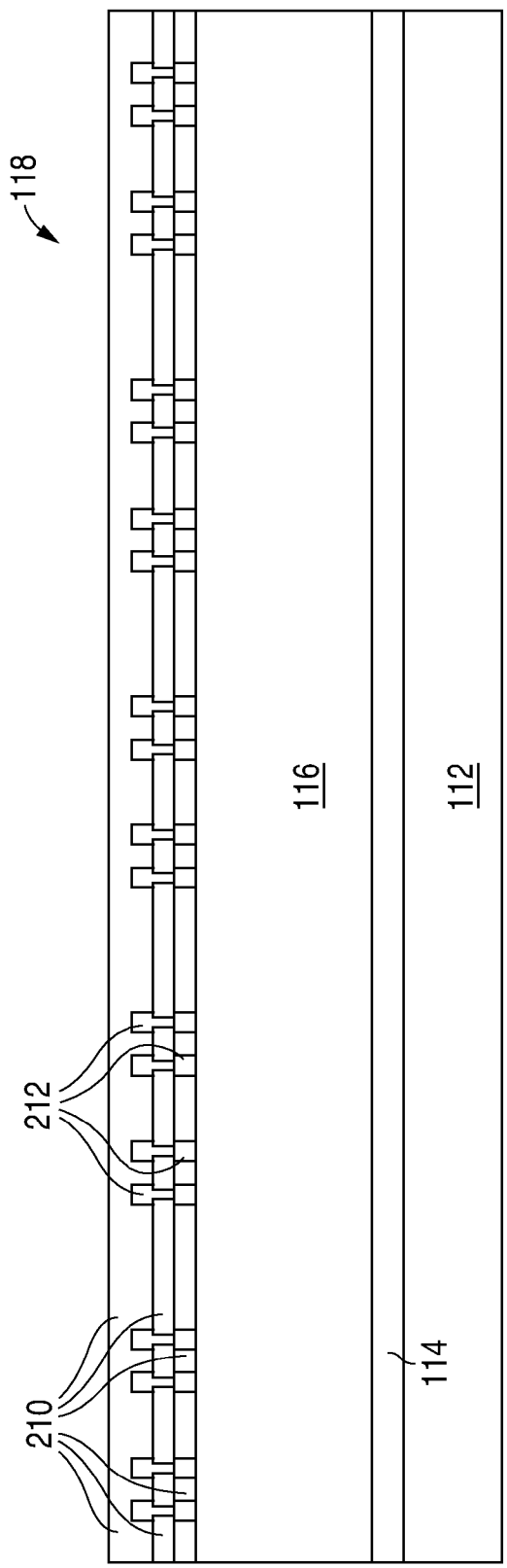

FIGS. 2A-2B show views that illustrate an example of detection structure 118 in accordance with a first embodiment of the present invention. FIG. 2A shows a plan view of detection structure 118, while FIG. 2B shows a cross-sectional view taken along line 2B-2B of FIG. 2A.

As shown in FIGS. 2A-2B, detection structure 118 includes an isolation structure 210 that touches metal interconnect structure 116, and a number of planar coils 212 arranged in rows and columns that touch isolation structure 210 and an isolation region of metal interconnect structure 116. In addition, the ends of the coils 212 touch a corresponding pair of metal vias within metal interconnect structure 116 to be electrically connected to the electronic devices within sensor structure 114.

The coils 212 can be implemented as multilayered coils to increase the magnitude of current that can flow through the coils 212 and, thereby, increase the inductance. In the present example, the coils 212 are illustrated with two layers of coils. The number of layers of coils 212 is determined by the inductance required.

During the fabrication of sensor die 110, the coils 212 of detection structure 118 are conventionally formed in the same manner that metal traces are formed, with the ends of each coil 212 touching the top surfaces of a pair of metal vias in the same manner that metal traces touch the top surfaces of underlying vias.

Figure 3A:
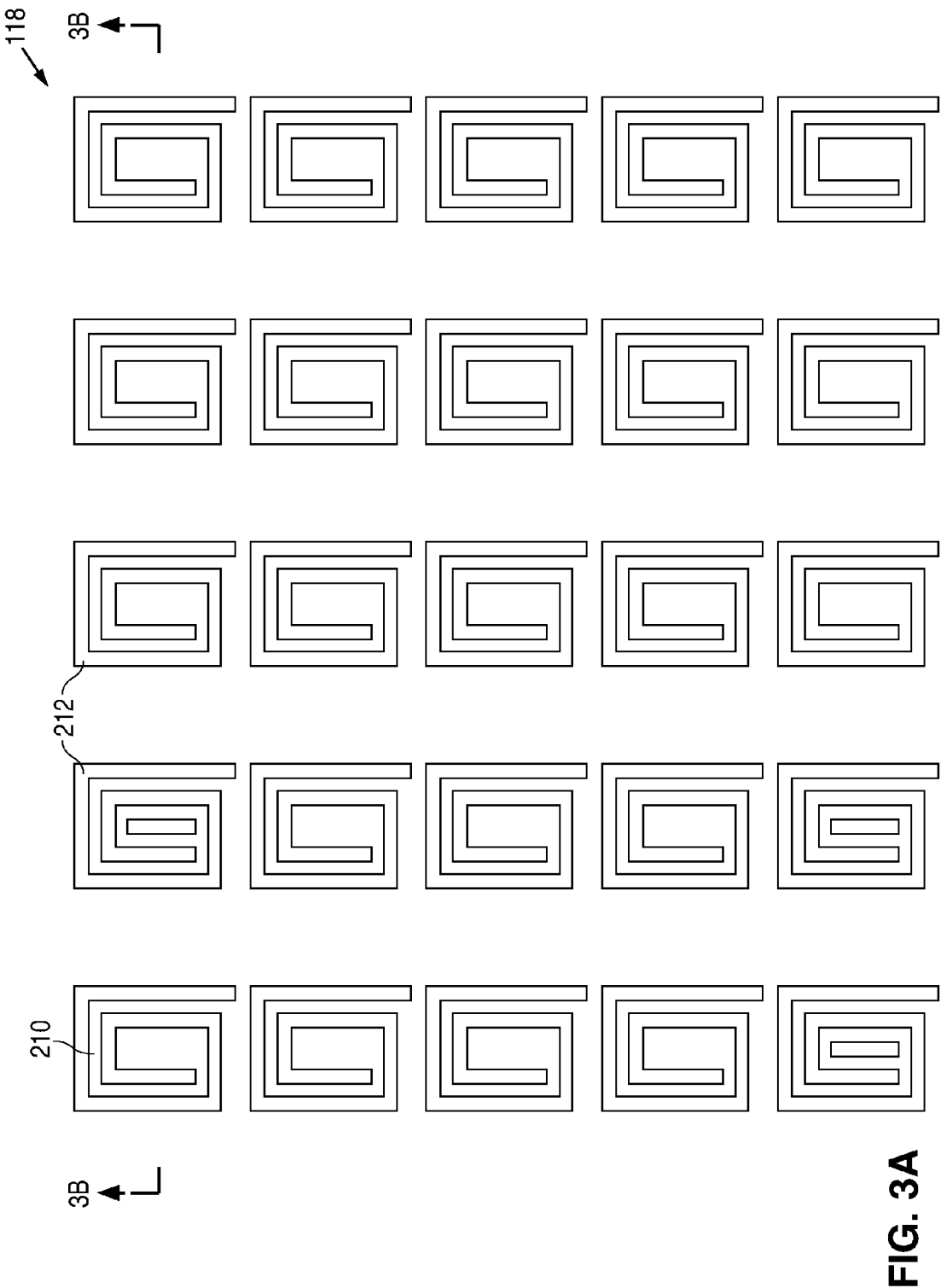
FIGS. 3A-3B are views illustrating an example of detection structure 118 in accordance with a second embodiment of the present invention.
Figure 3B:
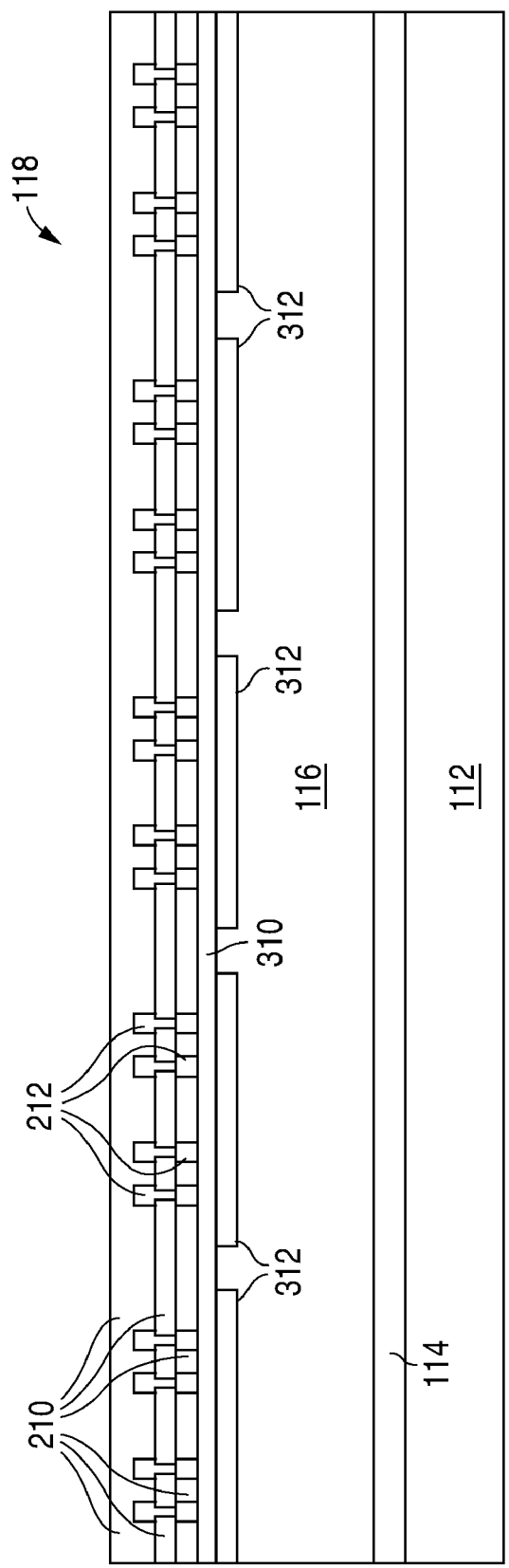

FIGS. 3A-3B show a series of views that illustrate an example of detection structure 118 in accordance with a second embodiment of the present invention. FIG. 3A shows a plan view of detection structure 118, while FIG. 3B shows a cross-sectional view taken along line 3B-3B of FIG. 3A. The second embodiment of detection structure 118 is similar to the first embodiment of detection structure 118 and, as a result, utilizes the same reference numerals to designate the elements which are common to both structures.

As shown in FIGS. 3A-3B, the second embodiment of detection structure 118 differs from the first embodiment of detection structure 118 in that the second embodiment of detection structure 118 includes an insulation structure 310 that touches isolation structure 210 and the coils 212, and a number of core sections 312 that touch insulation structure 310 and metal interconnect structure 116. In this embodiment, each coil 212 is formed over a corresponding core section 312, which increases the magnetic permeability of the flux path along the bottom side of the coil 212.

Each core section 312, in turn, can include a thin plate shape with an opening to provide access for a metal via to make a connection with the bottom surface of the inner end of a coil 212. During the fabrication of sensor die 110, the core sections 312 of detection structure 118 are conventionally formed in the same manner that metal traces are formed, except that the core sections 312 are formed from a soft magnetic material.

For example, amorphous, nanocrystalline, or granular alloys can be used to achieve high permeability and high electrical resistivity. A high resistivity reduces the effects of eddy currents. For example, cobalt tantalum zirconium (Co-TaZr) is an amorphous material with a high permeability and a high electrical resistivity.

Laminated structures (e.g., alternating layers of a soft magnetic material and an insulator), which significantly reduce the effects of eddy currents, can alternately be used. In addition, some non-amorphous materials have a relatively high electrical resistivity. For example, an alloy of nickel and iron like permalloy has a relatively high electrical resistivity.

Figure 5:
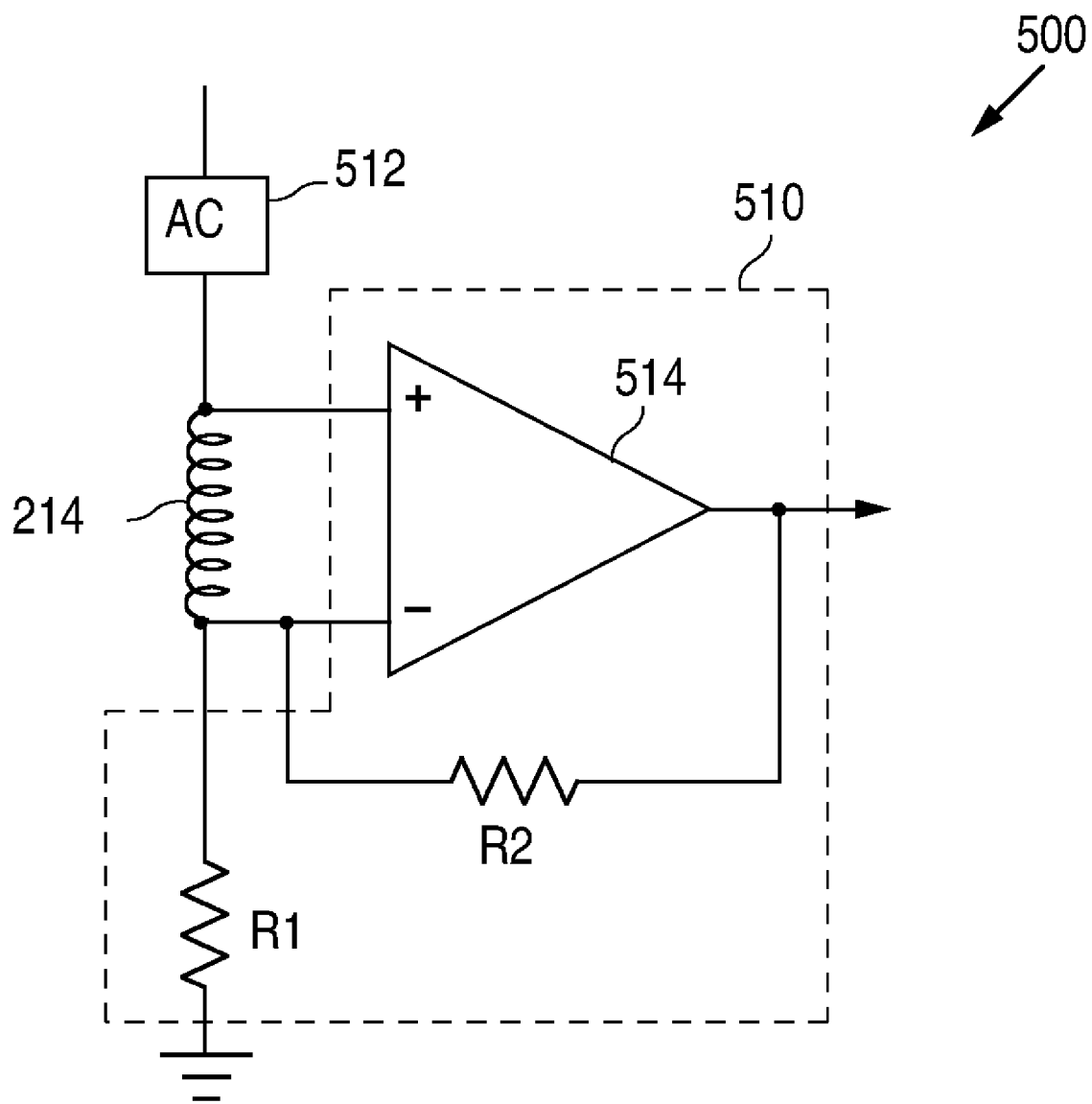
FIG. 5 is a schematic diagram illustrating an example of a sensor circuit 500 for measuring the voltage across a coil 212 in accordance with the present invention.

Alternately, a segmented core structure, such as magnetic core element 500 shown in FIG. 5 of U.S. Pat. No. 7,456,030 issued on Nov. 25, 2008 to Peter J. Hopper, which is hereby incorporated by reference, can be utilized to form each core section 312. Magnetic core element 500 has a center opening which provides access for a metal via to make a connection with the bottom surface of the inner end of a coil 212.

The magnetic core inductors 20 of U.S. Pat. No. 7,652,348 issued on Jan. 26, 2010 to Peter J. Hopper et al, which is hereby incorporated by reference, can also be utilized to form each core section 312. The magnetic core inductors 20 also have a center opening which provides access for a metal via to make a connection with the bottom surface of the inner end of a coil 212.

Figure 4A:
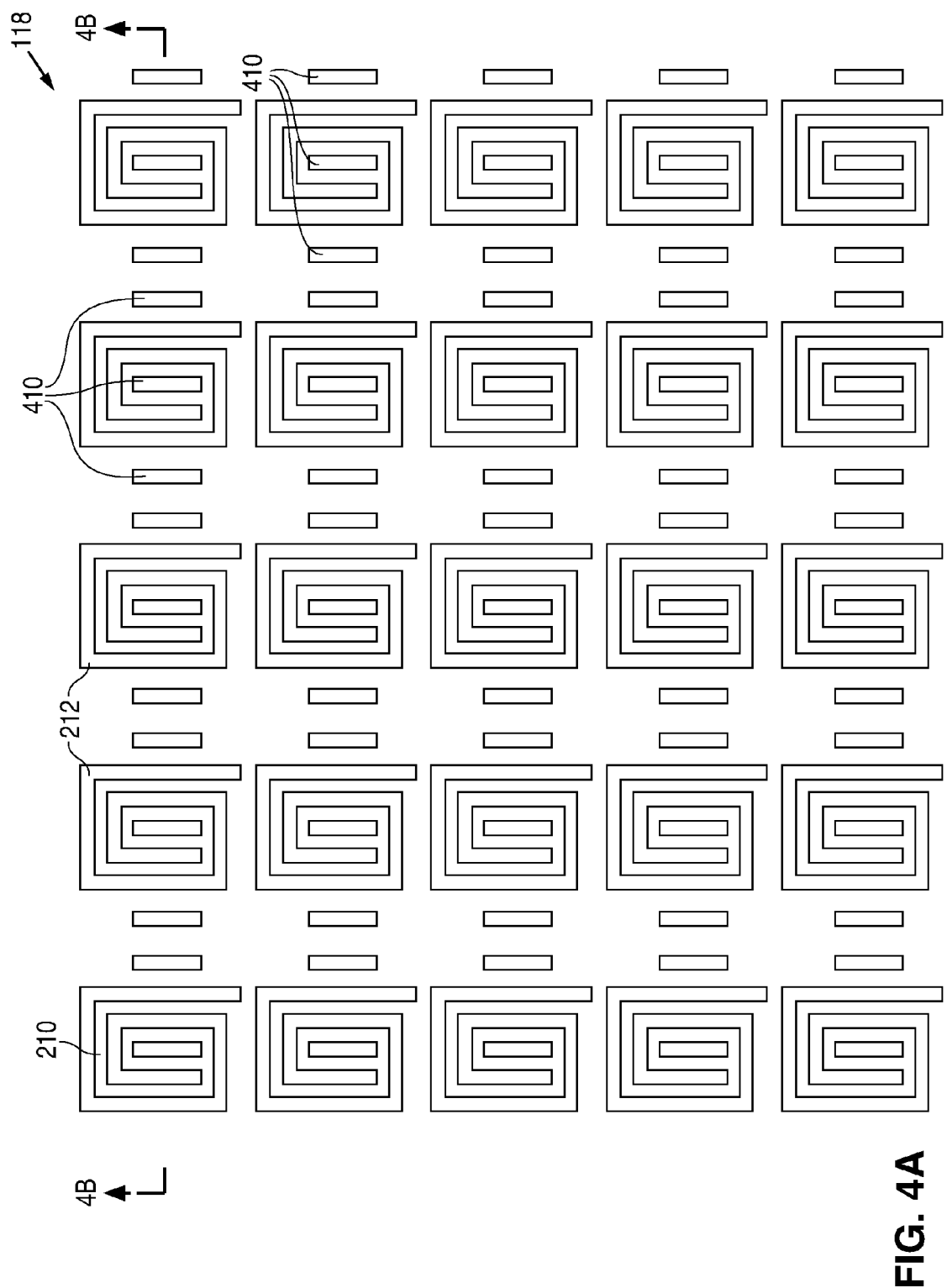
FIGS. 4A-4B are views illustrating an example of detection structure 118 in accordance with a third embodiment of the present invention.
Figure 4B:
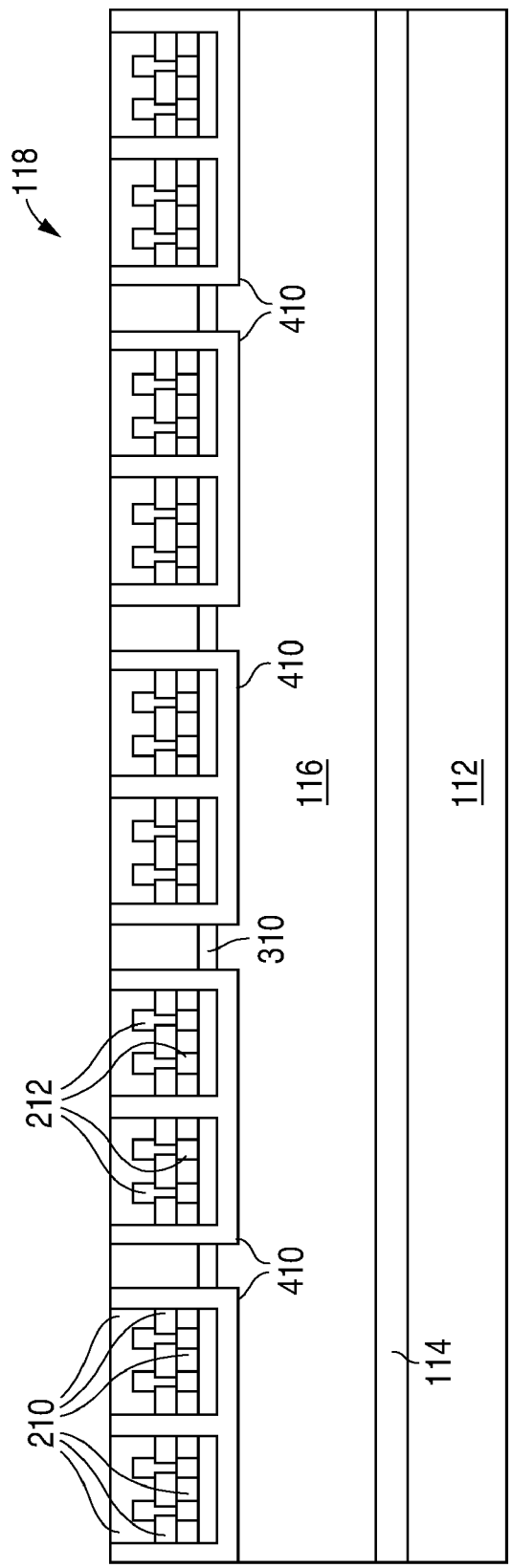

FIGS. 4A-4B show views that illustrate an example of detection structure 118 in accordance with a third embodiment of the present invention. FIG. 4A shows a plan view of detection structure 118, while FIG. 4B shows a cross-sectional view taken along line 4B-4B of FIG. 4A. The third embodiment of detection structure 118 is similar to the second embodiment of detection structure 118 and, as a result, utilizes the same reference numerals to designate the elements which are common to both structures.

As shown in FIGS. 4A-4B, the third embodiment of detection structure 118 differs from the second embodiment of detection structure 118 in that the third embodiment of detection structure 118 utilizes an E-shaped core section 410, where the E shape is rotated 90° counterclockwise, in lieu of each core section 312. In this embodiment, each coil 212 is wrapped around a corresponding core section 412, which increases the magnetic permeability of the vertical flux path in addition to increasing the magnetic permeability of the flux path along the bottom side of the coil 212.

During the fabrication of sensor die 110, the core sections 410 of detection structure 118 are conventionally formed. For example, the core sections 410 of detection structure 118 can be formed as taught by U.S. patent application Ser. No. 12/816,788 filed on Jun. 16, 2010 to Peter Smeys et al, which is hereby incorporated by reference, except for the following changes.

First, rather than forming the bottom core section 120 in wafer 110 as taught by Smeys, the bottom core 120 is instead formed in an isolation region that forms the top surface of the present metal interconnect structure 116. Second, rather than placing top core section 180 in the openings 172 and attaching top core section 180 to the top surface of non-conductive layer 170 as taught by Smeys, three middle core sections are placed in the openings 172 and attached to the side walls of non-conductive layers 140, 154, and 170 so that the top surfaces of the three middle core sections lie substantially in the same plane as the top surface of non-conductive layer 170.

Third, the coils sections 2130 and 2132 in Smeys are formed to touch the top surfaces of metal vias which are connected to metal traces and vias in the present metal interconnect structure 116 to be electrically connected to the electronic devices in the sensor circuits. In this example, the metal lines 2176 of Smeys need not be formed.

Referring again to FIGS. 1A-1B, the electronic devices in sensor structure 114 are connected together with metal interconnect structure 116 to form a number of sensor circuits that are connected to the coils 212 in detection structure 118 so that each coil 212 has an associated sensor circuit that measures the voltage across the coil 212.

The sensor circuits can be implemented with any conventional sensor circuit that can detect the difference in voltage between two nodes, be realized by the electronic devices in sensor structure 114, and electrically connected together by metal interconnect structure 116 to form the circuit.

FIG. 5 shows a schematic diagram that illustrates an example of a sensor circuit 500 for measuring the voltage across a coil 212 in accordance with the present invention. As shown in FIG. 5, sensor circuit 500 includes an operational amplifier circuit 510 and an AC source 512 connected to operational amplifier circuit 510.

Operational amplifier circuit 510 includes an operational amplifier 514 and resistors R1 and R2 that are connected to operational amplifier 514 in a non-inverting amplifier configuration. The inputs of operational amplifier 514, in turn, are connected to the opposite ends of a planar coil 212 to measure the change in voltage across coil 212.

In the operation of sensor circuit 500, AC source 512 outputs an alternating current to coil 212. The frequency of the alternating current is, for example, 100 KHz, while the magnitude of the alternating current is insufficient to generate a magnetic field that is equal to or greater than the minimum value required to begin to change ferrofluid 140 into a deformable solid state. With orientation sensor 100, no current is ever input to any coil 212 that is sufficient to generate a magnetic field with a magnitude that is equal to or greater than the minimum value required to begin to change ferrofluid 140 to a deformable solid state.

The alternating current sourced to a coil 212 generates a voltage v across the coil 212 defined by:

$$v = L(di/dt) \qquad \text{EQ. 1}$$

where L is the inductance of the coil 212 and (di/dt) is the change in current over time.

Figure 6A:
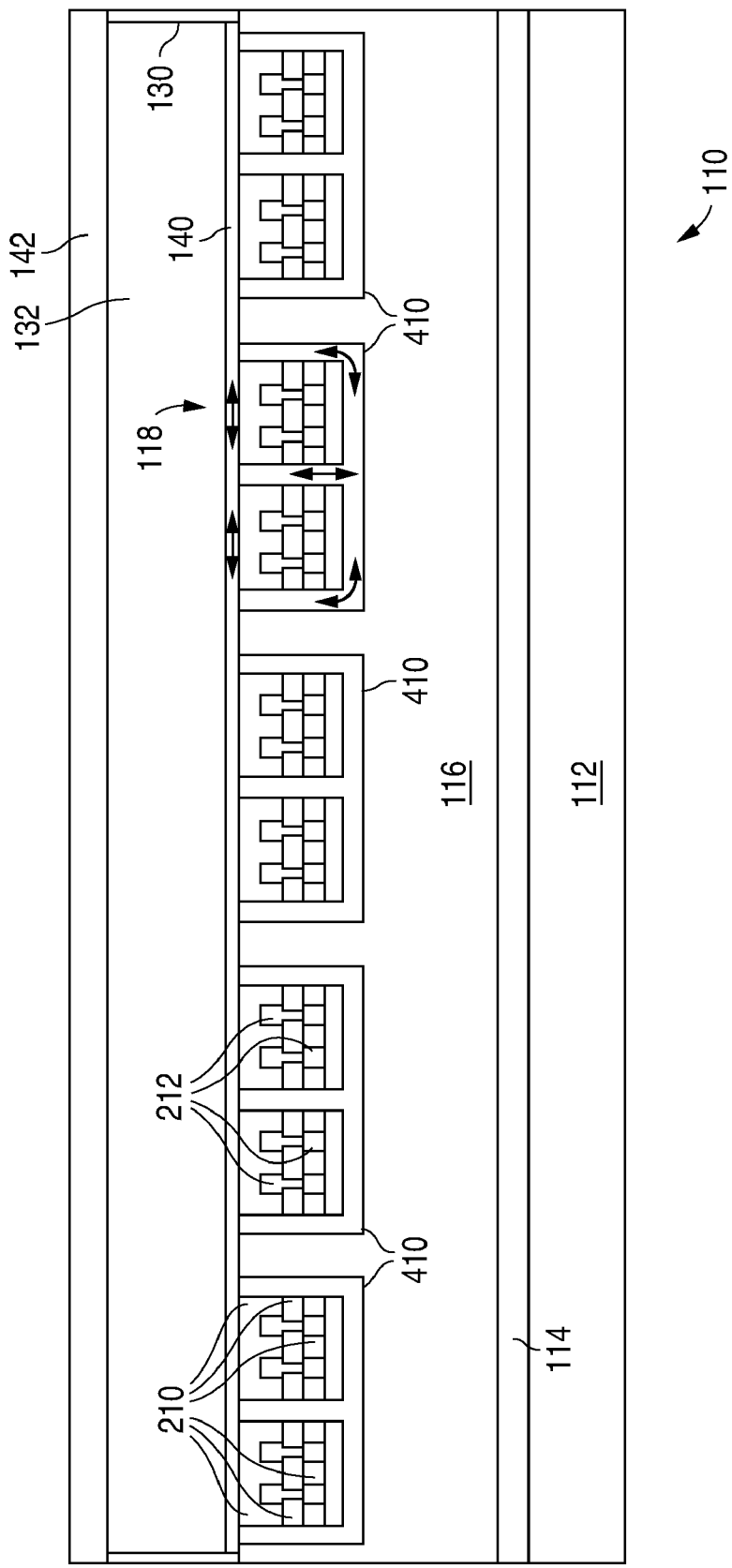
FIGS. 6A-6B are views showing sensor die 110, detection structure 118, body 130, ferrofluid 140, and cap 142, and illustrating the operation of orientation sensor 100 in accordance with the present invention.
Figure 6B:
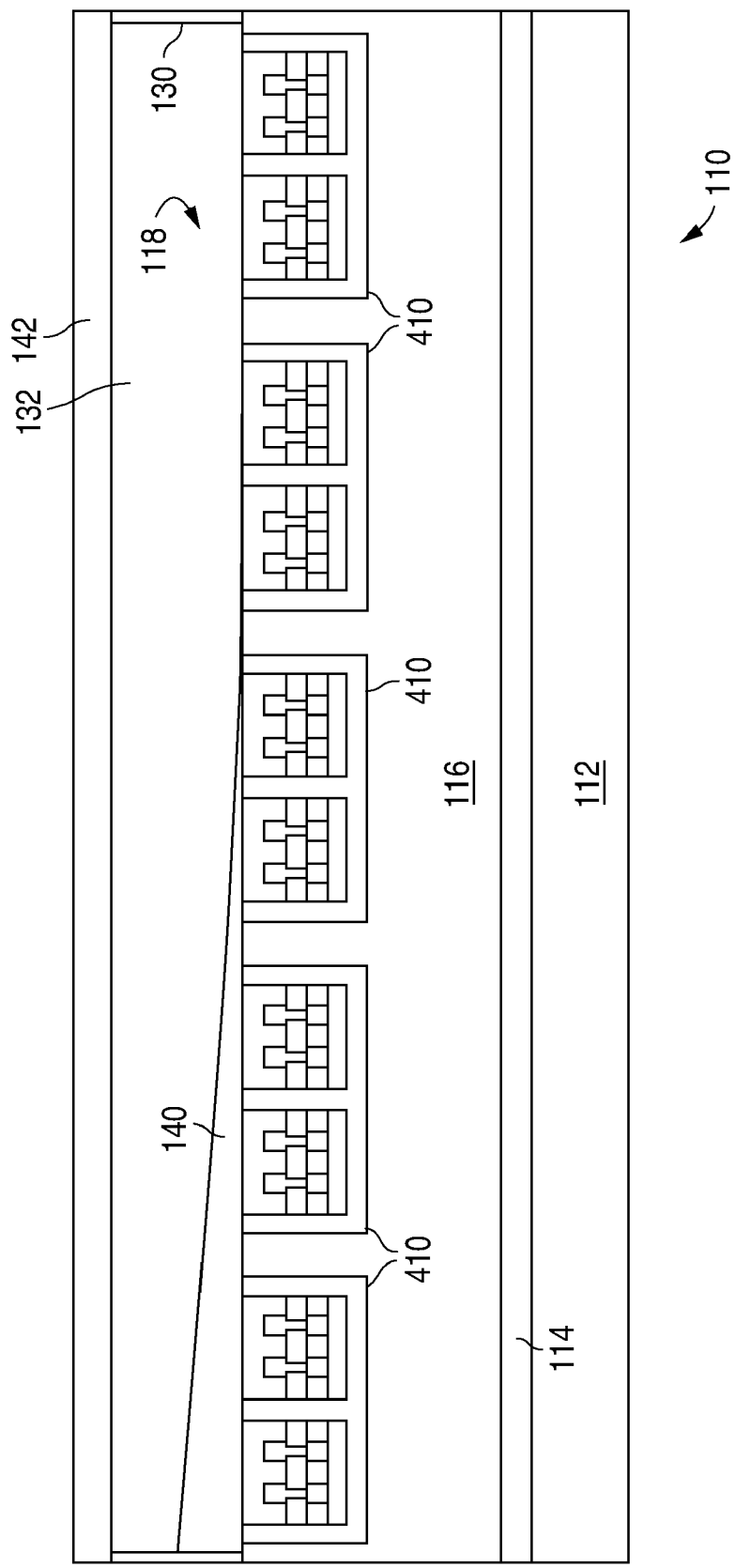

FIGS. 6A-6B are views that show sensor die 110, detection structure 118, body 130, ferrofluid 140, and cap 142, and illustrate the operation of orientation sensor 100 in accordance with the present invention. FIGS. 6A and 6B are cross-sectional views taken along line 4B-4B of FIG. 4A. As described below, ferrofluid 140 alters the permeabilities of the flux paths as the position of orientation sensor 100 varies.

When a coil 212 is energized by an alternating current, the resulting magnetic flux follows a path around the coil 212. In the first embodiment of detection structure 118, the magnetic flux passes along the bottom of a coil 212 and vertically by the coil 212 through isolation material, which has a low magnetic permeability.

In the second embodiment of detection structure 118, the magnetic flux passes along the bottom of a coil 212 through core structure 312, which has a high magnetic permeability, and vertically by the coil 212 through isolation material, which has a low magnetic permeability. In the third embodiment of detection structure 118, as shown by the arrows in FIG. 6A, the magnetic flux passes along the bottom of a coil 212 and vertically by the coil 212 through core structure 410, which has a high magnetic permeability.

In addition, in each embodiment of detection structure 118, magnetic flux also passes along the top of a coil 212. However, the magnetic permeability across the top of a coil 212 depends on the depth of the ferrofluid across the top of the coil 212. As the depth of the ferrofluid 140 across the top of the coil 212 increases, the magnetic permeability across the top of the coil 212 increases. As the depth of the ferrofluid 140 across the top of the coil 212 decreases, the magnetic permeability across the top of the coil 212 decreases.

As shown in FIG. 6A, when orientation sensor 100 is placed in a flat stationary position, ferrofluid 140 has an equivalent depth over each coil 212. Thus, since the voltage across a coil 212 is a function of the inductance of the coil 212, the inductance of the coil 212 is a function of the magnetic permeability of the flux path, and the magnetic permeability associated with each coil 212 is the same due to the equivalent depth of ferrofluid 140, the voltage across each coil 212 is substantially the same when orientation sensor 100 is placed in a flat stationary position.

On the other hand, as shown in FIG. 6B, when orientation sensor 100 is tilted, ferrofluid 140 shifts to one end, increasing the depth of ferrofluid 140 at one end while decreasing the depth of ferrofluid 140 at the opposite end. In the FIG. 6B example, two coils 212 in each row are no longer covered by ferrofluid 140 at all.

The inductance of a coil, and thereby the voltage across the coil, can be increased by a factor of several thousand by increasing the magnetic permeability of the flux path. The increasing depth of ferrofluid 140 at one end increases the permeability at that end, thereby increasing the magnitude of the inductance and the voltage across the coils 212 at that end.

At the same time, the decreasing depth of ferrofluid 140 at the opposite end decreases the permeability at the opposite end, thereby decreasing the magnitude of the inductance and the voltage across the coils 212 at the opposite end. For example, the magnitude of the inductance and the voltage across the coils 212 which are no longer covered by ferrofluid 140 is substantially less since the magnetic permeability across the top of the coils 212 is now the permeability of air.

As a result, the amount of tilt experienced by orientation sensor 100 can be determined by measuring the change in the voltage across the coils 212. In addition, acceleration and deceleration along a flat surface also causes the measure of ferrofluid 140 to shift to one end. As a result, acceleration and deceleration along a flat surface can also be measured in the same manner.

Figure 7A:
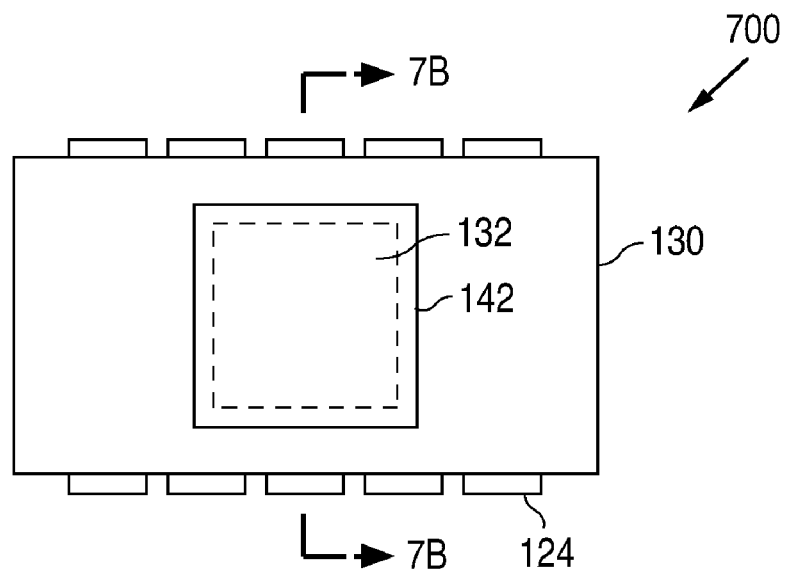
FIGS. 7A-7B are views illustrating an example of a ferrofluidic orientation sensor 700 in accordance with the present invention.
Figure 7B:
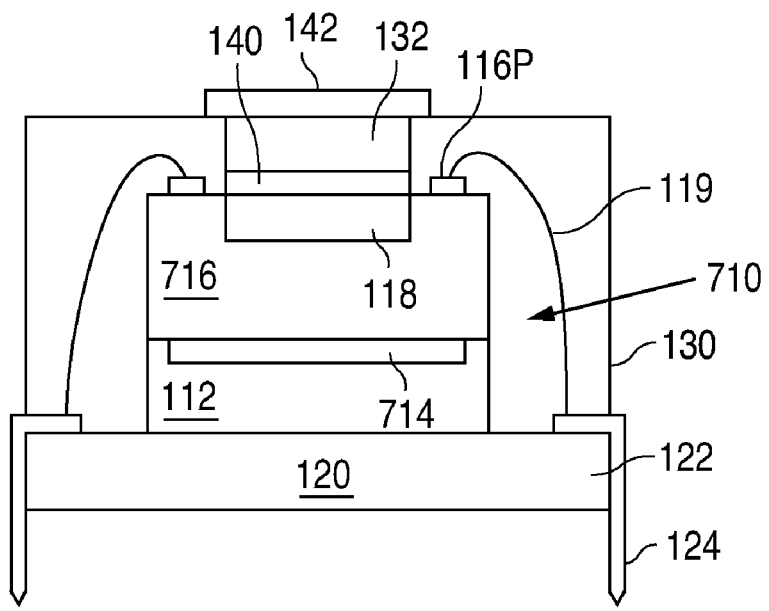

FIGS. 7A-7B show views that illustrate an example of a ferrofluidic orientation sensor 700 in accordance with the present invention. FIG. 7A shows a plan view of ferrofluidic orientation sensor 700, while FIG. 7B shows a cross-sectional view taken along line 7B-7B of FIG. 7A. Orientation sensor 700 is similar to orientation sensor 100 and, as a result, utilizes the same reference numerals to designate the elements which are common to both sensors.

As shown in FIG. 7B, orientation sensor 700 differs from orientation sensor 100 in that orientation sensor 700 utilizes a sensor die 710 in lieu of sensor die 110. Sensor die 710, in turn, differs from sensor die 110 in that sensor die 710 utilizes a sensor structure 714 in lieu of sensor structure 114, and a metal interconnect structure 716 in lieu of metal interconnect structure 116.

Further, in orientation sensor 700, ferrofluid 140 is partially free flowing, where partially free flowing is defined to mean that ferrofluid 140 is subjected to a magnetic field which is strong enough to cause ferrofluid 140 to begin to change states, but is insufficient to cause all of the ferrofluid 140 to change into a solid state, i.e., ferrofluid 140 is subjected to a magnetic field with a magnitude that is equal to or greater than the minimum value, but less than the solid state value.

Thus, in orientation sensor 700, no permanent magnet with a magnetic field that is equal to or greater than the solid state value touches sensor die 110, lead frame 120, body 130, ferrofluid 140, or cap 142. In addition, no electromagnet that touches sensor die 110, lead frame 120, body 130, ferrofluid 140, or cap 142 generates a magnetic field with a magnitude that is equal to or greater than the solid state value.

The electronic devices in sensor structure 714 are connected together by metal interconnect structure 716 to form a number of sensor circuits that are the same as the sensor circuits in sensor die 110, and also to form a number of DC-biased sensor circuits that are connected to a corresponding number of coils 212. The DC-biased sensor circuits can be implemented with any conventional bias circuit that allows a direct current to be input to a coil 212 in a sensor circuit.

Figure 8:
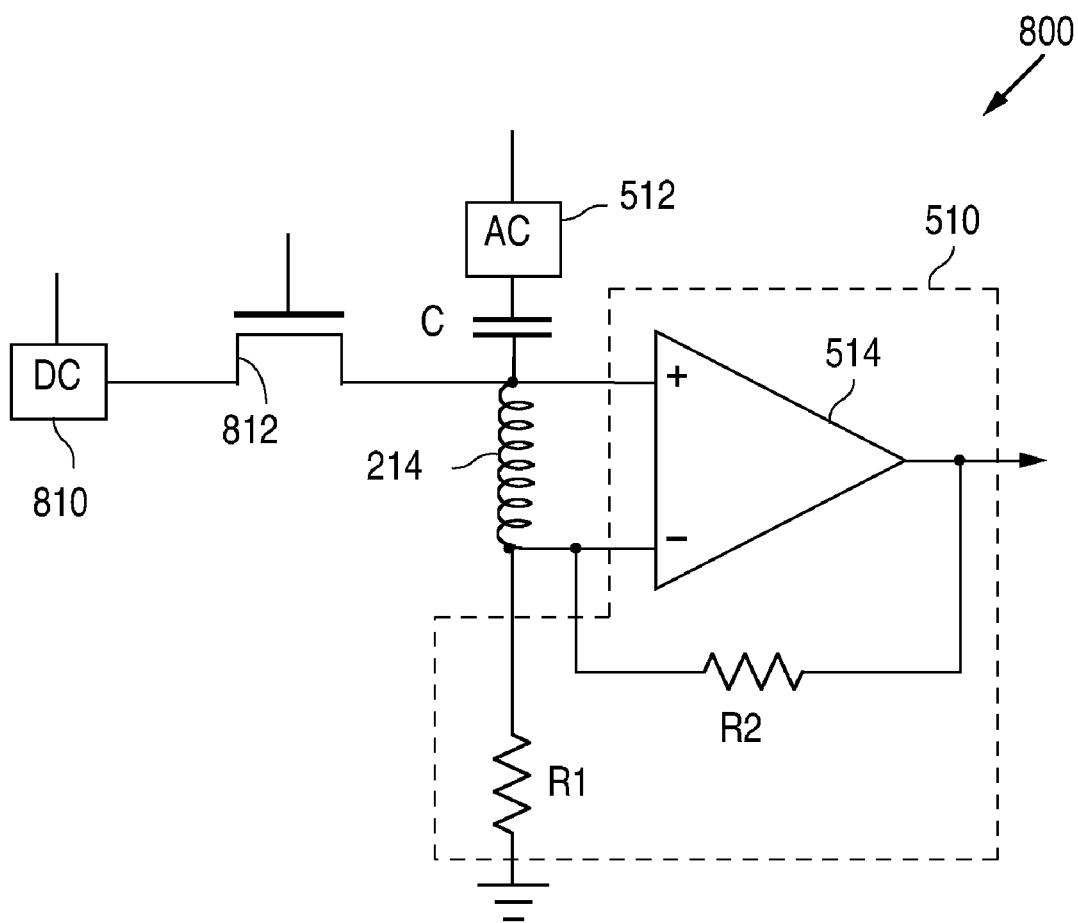
FIG. 8 is a schematic diagram illustrating an example of a DC-biased sensor circuit 800 in accordance with the present invention.

FIG. 8 shows a schematic diagram that illustrates an example of a DC-biased sensor circuit 800 in accordance with the present invention. Sensor circuit 800 is similar to sensor circuit 500 and, as a result, utilizes the same reference numerals to designate the elements that are common to both circuits.

As shown in FIG. 8, sensor circuit 800 differs from sensor circuit 500 in that sensor circuit 800 includes a DC current source 810, a MOS transistor 812 that is connected to DC current source 810 and the positive input of operational amplifier 514, and a capacitor C that is connected between MOS transistor 812 and AC source 512.

In operation, when MOS transistor 812 is turned on, alternating current from AC source 512 and direct current from DC current source 810 are input to coil 212. Circuit 800 responds to the alternating current in the same manner as described above. However, the magnitude of the direct current generates a magnetic field with a magnitude that is sufficient to partially change ferrofluid 140 from a liquid into a deformable solid state, but insufficient to completely change all of the measure of ferrofluid 140 from a liquid into a deformable solid state. Thus, for example, when the direct current is input to a single coil 212, a deformable solid structure is formed over the single coil 212, while a layer of ferrofluid 140 remains over the remaining coils 212.

Figure 9A:
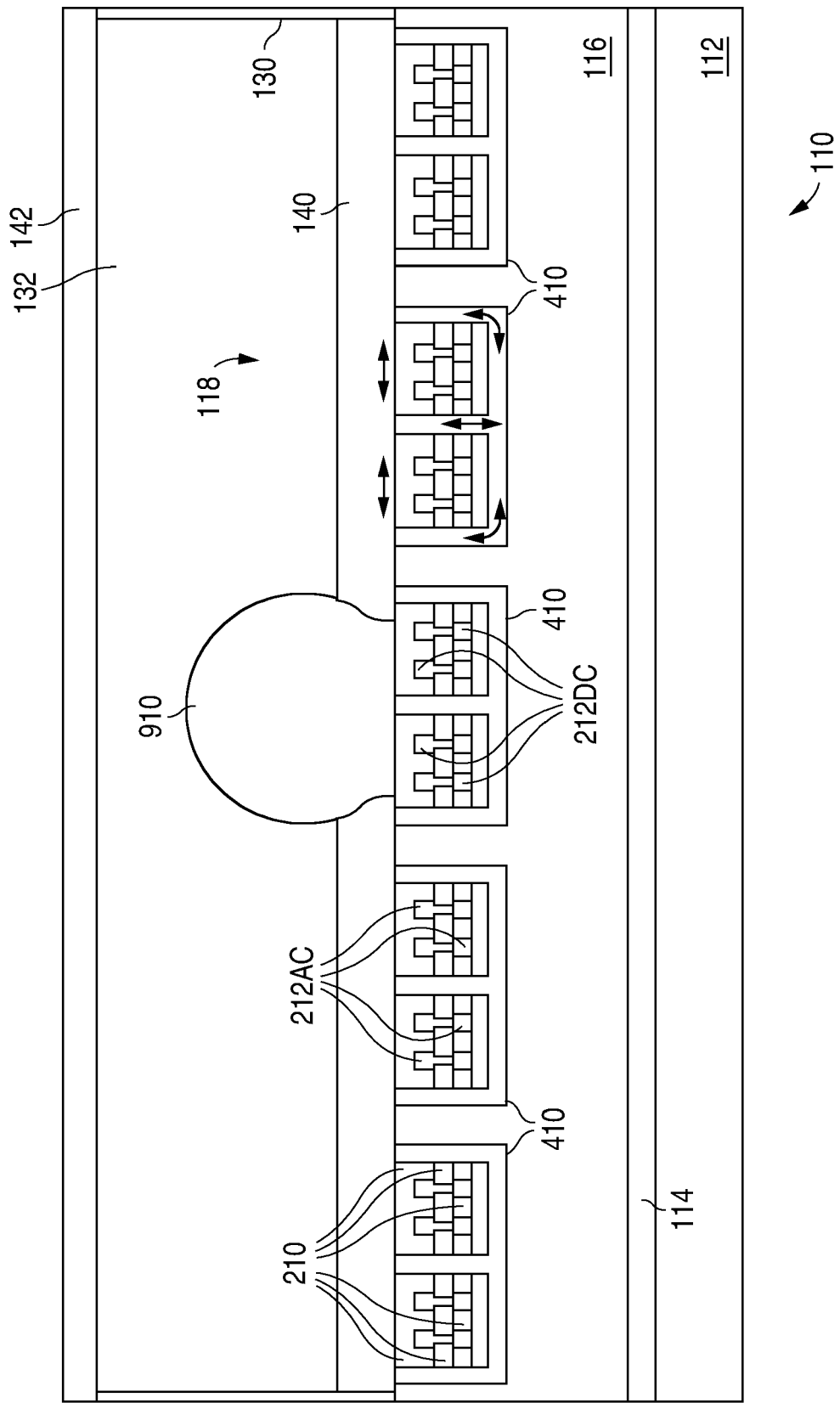
FIGS. 9A-9C are views showing a portion of sensor die 710, detection structure 118, body 130, ferrofluid 140, and cap 142, and illustrating the operation of orientation sensor 700 in accordance with the present invention.
Figure 9B:
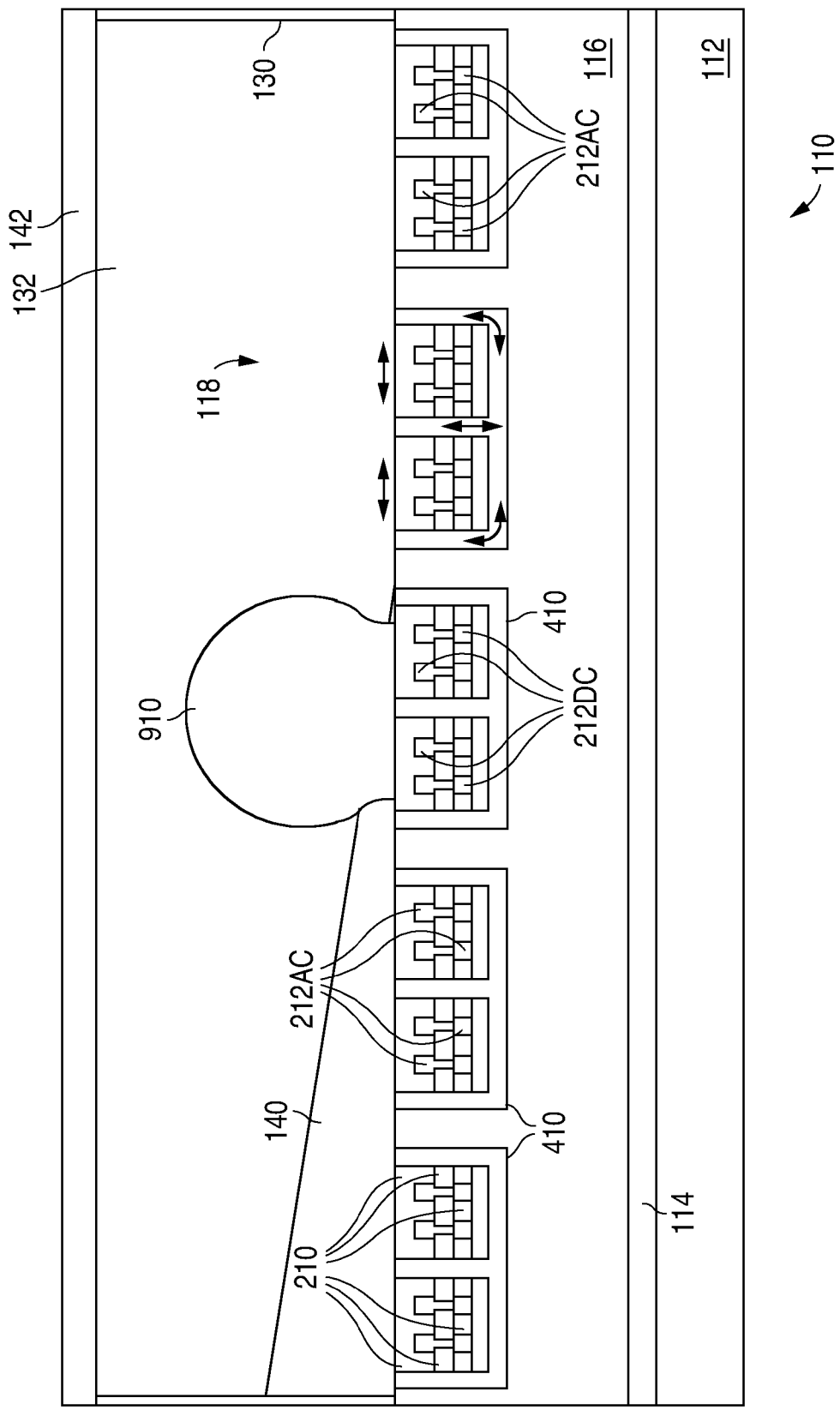
Figure 9C:
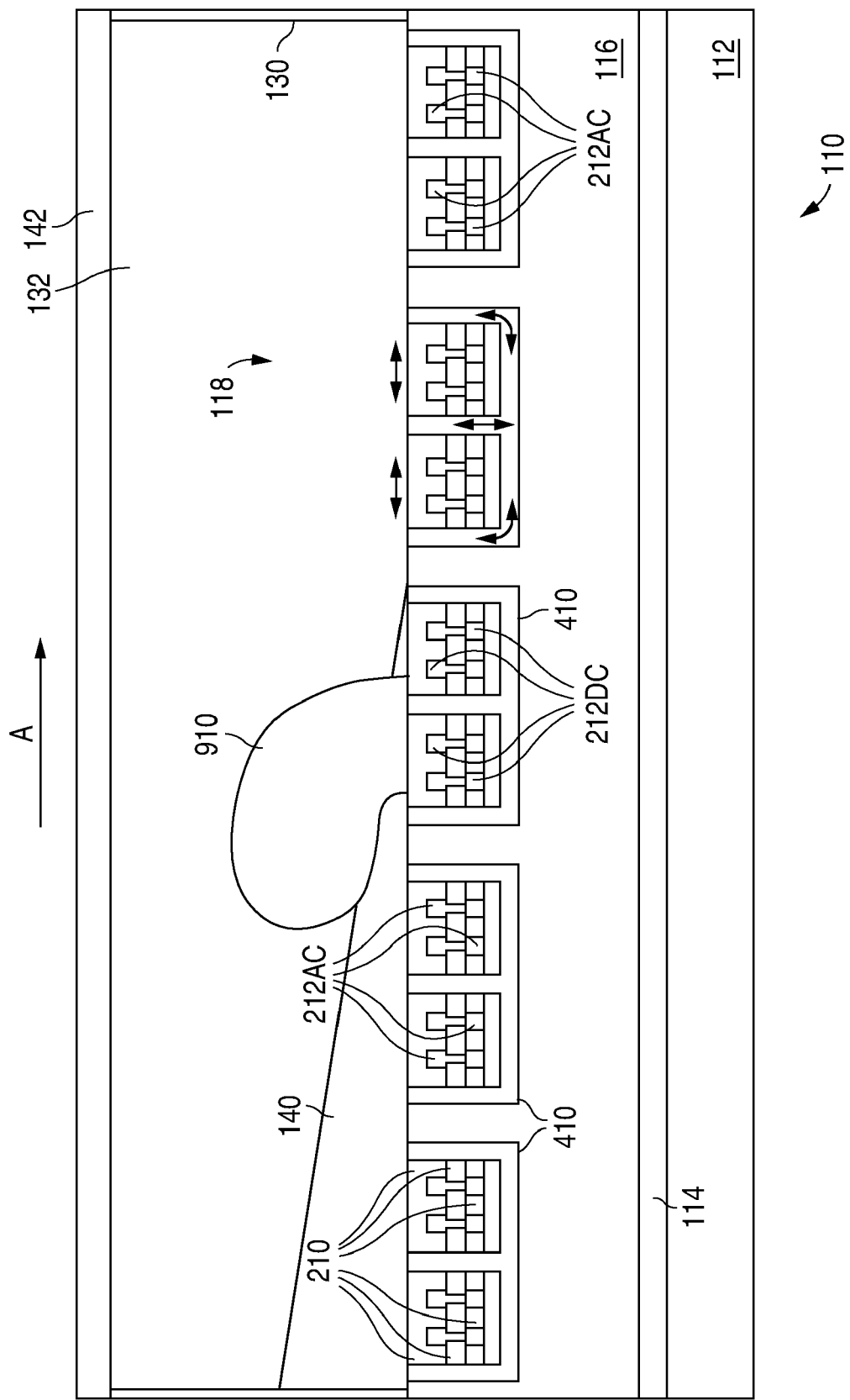

FIGS. 9A-9C show views that show a portion of sensor die 510, detection structure 118, body 130, ferrofluid 140, and cap 142, and illustrate the operation of orientation sensor 700 in accordance with the present invention. FIGS. 9A and 9B are cross-sectional views taken along line 4B-4B of FIG. 4A.

In operation, the alternating and direct currents are input to a number of coils 212DC, and only the alternating current is input to the remaining coils 212AC. As a result, as shown in FIG. 9A, deformable solid structures 910 are formed over each of the coils 212DC, while liquid ferrofluid 140 remains over the remaining coils 212AC. (Only one structure 910 is shown for simplicity.)

As with orientation sensor 100, when orientation sensor 700 is placed in a flat stationary position as shown in FIG. 9A, the liquid ferrofluid 140 has an equivalent depth over each coil 212. As a result, when orientation sensor 700 is placed in a flat stationary position, the permeability of the path across the top of each coil 212AC is the same, while the permeability of the path across the top of each coil 212DC is the same. Thus, the voltage across each coil 212AC is substantially the same, and the voltage across each coil 212DC is substantially the same when orientation sensor 700 is placed in a flat stationary position.

As shown in FIG. 9B, when orientation sensor 700 is tilted, the liquid ferrofluid 140 shifts to one end, increasing the depth of ferrofluid 140 at one end, while decreasing the depth of ferrofluid 140 at the opposite end. In the FIG. 9B example, two coils 212 in each row are no longer covered by ferrofluid 140.

As before, the increasing depth of ferrofluid 140 at one end increases the permeability at that end, thereby increasing the magnitude of the inductance and the voltage across the coils 212AC at that end, while the decreasing depth of ferrofluid 140 at the opposite end decreases the permeability at the opposite end, thereby decreasing the magnitude of the inductance and the voltage across the coils 212AC at the opposite end. For example, the magnitude of the inductance and the voltage across the coils 212AC which are no longer covered by ferrofluid 140 is substantially less.

However, the original shape of the deformable solid structures 910 is substantially retained when orientation sensor 700 is tilted, with only the force of gravity providing any distortion to the shape of the deformable solid structures 910. Thus, as before, the amount of tilt experienced by orientation sensor 700 can be determined by measuring the change in the voltage across the coils 212AC.

As shown in FIG. 9C, when orientation sensor 700 is both tilted and accelerated in the direction A, the liquid ferrofluid 140 shifts to one end as before, increasing the depth of ferrofluid 140 at one end, while decreasing the depth of ferrofluid 140 at the opposite end. However, when subjected to acceleration, the deformable solid structures 910 also deform and change shape in response to the acceleration.

The change in shape experienced by the deformable solid structures 910 alters the permeability of the flux path of the coils 212DC as well as of the adjacent coils 212AC which a deformable solid structure 910 moves towards in response to the acceleration. Thus, orientation sensor 700 allows tilt to be distinguished from acceleration by measuring the change in the voltage across the coils 212AC and 212DC.

Figure 10A:
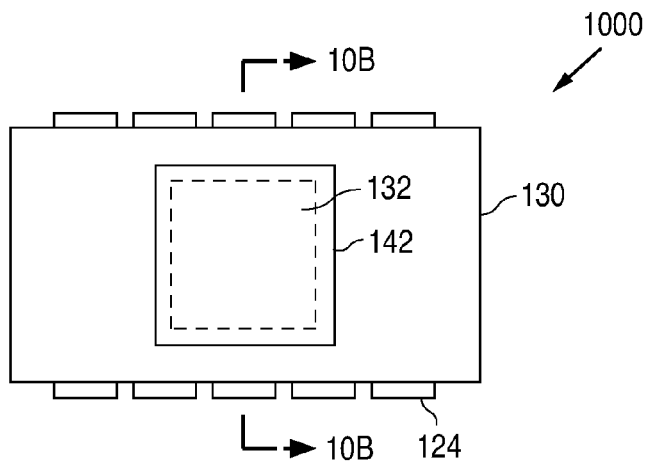
FIGS. 10A-10B are views illustrating an example of a ferrofluidic orientation sensor 1000 in accordance with the present invention.
Figure 10B:
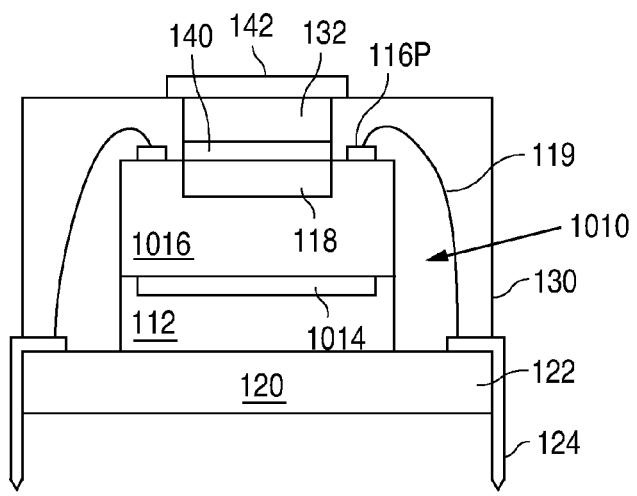

FIGS. 10A-10B show a series of views that illustrate an example of a ferrofluidic orientation sensor 1000 in accordance with the present invention. FIG. 10A shows a plan view of ferrofluidic orientation sensor 1000, while FIG. 10B shows a cross-sectional view taken along line 10B-10B of FIG. 10A. Orientation sensor 1000 is similar to orientation sensor 700 and, as a result, utilizes the same reference numerals to designate the elements which are common to both sensors.

As shown in FIG. 10B, orientation sensor 1000 differs from orientation sensor 700 in that orientation sensor 1000 utilizes a sensor die 1010 in lieu of sensor die 710. Sensor die 1010 differs from sensor die 710 in that sensor die 1010 utilizes a sensor structure 1014 in lieu of sensor structure 714, and a metal interconnect structure 1016 in lieu of metal interconnect structure 716.

Sensor structure 1014 and metal interconnect structure 1016, in turn, differ from sensor structure 714 and metal interconnect structure 716 in that sensor structure 1014 and metal interconnect structure 1016 are connected together so that a number of coils 212 are selected to form a circle, and a number of DC-biased sensor circuits 800 are connected to the coils 212 in the circle so that each coil 212 in the circle has a corresponding DC-biased sensor circuit 800. (Sensor structures 714 and 1014 can be identical if the same number of DC-biased sensor circuits 800 are present in the layout required by metal interconnect structure 1016.)

Figure 11:
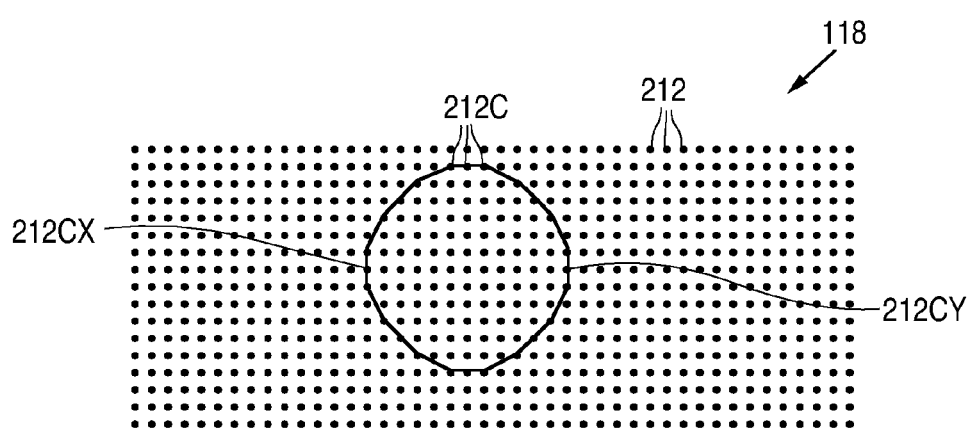
FIG. 11 is a plan view illustrating detection structure 118 of orientation sensor 1000 in accordance with the present invention.

FIG. 11 shows a plan view that illustrates detection structure 118 of orientation sensor 1000 in accordance with the present invention. As shown in FIG. 11, a number of coils 212C are identified that form a circle. Each of the coils 212C, in turn, is connected to a corresponding DC-bias sensor circuit 800. Alternately, a number of coils 212C can be formed equidistance from a center point to form a circle of coils 212C within the rows and columns of coils 212.

In the operation of orientation sensor 1000, the MOS transistors 812 in the DC-biased sensor circuits 800 are turned on and off with a timing that causes a single deformable solid structure to continuously move at a high speed around the circle of coils 212C from coil 212C to coil 212C. Moving the single deformable solid shape at a high speed around the circle of coils 212C from coil 212C to coil 212C provides a gyroscopic effect.

Figure 12A:
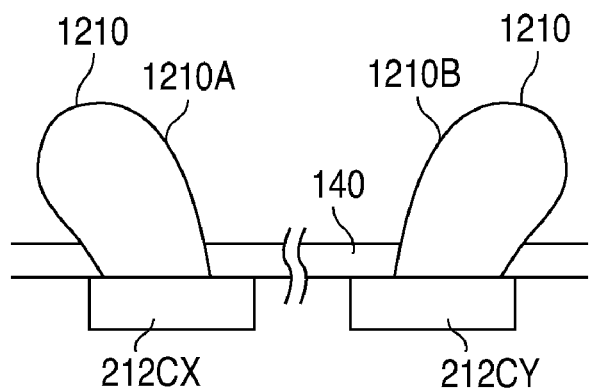
FIGS. 12A-12C are cross-sectional views illustrating the operation of orientation sensor 1000 in accordance with the present invention.
Figure 12B:
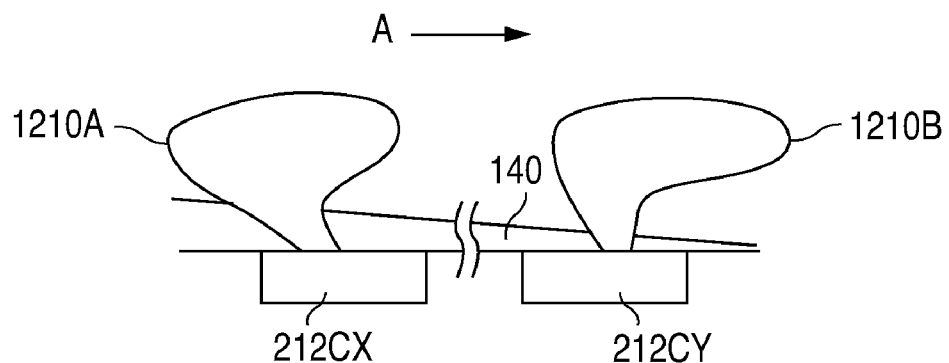
Figure 12C:
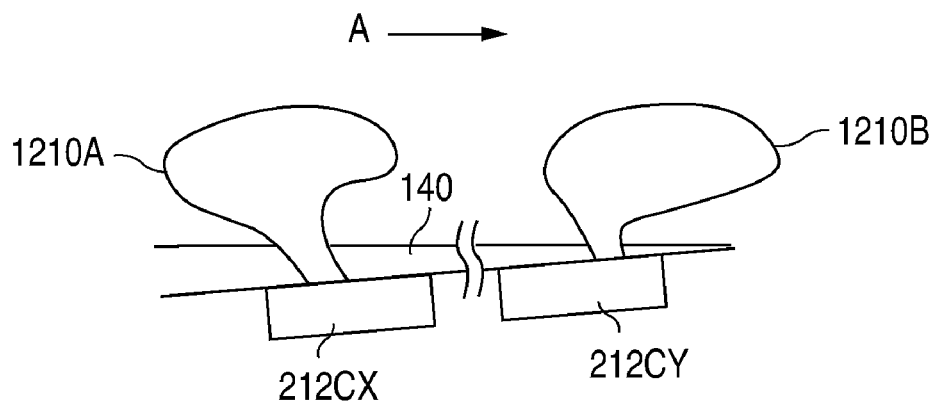

FIGS. 12A-12C show cross-sectional views that illustrate the operation of orientation sensor 1000 in accordance with the present invention. FIG. 12A shows the shape of a single deformable solid structure 1210, which has a mass center, rotating clockwise at a high speed. Structure 1210A shows the shape of structure 1210 at coil 212CX when passing by coil 212CX in FIG. 11, while structure 1210B shows the shape of structure 1210 at coil 212CY when passing by coil 212CY in FIG. 11.

As shown in FIG. 12A, the rotation of deformable solid structure 1210 causes deformable solid structure 1210 to lean outward. The large angular momentum of the mass center prevents the mass center from significant changes when orientation sensor 1000 is subject to changes in orientation.

As a result, changes in orientation cause deformable solid structure 1210 to take on different shapes that maintain substantially the same mass center. The different shapes of deformable solid structure 1210, in turn, are sensed by the change in voltage across the coils due to the change of inductance resulting from the change in permeability.

FIG. 12B shows the shape of deformable solid structure 1210 when accelerated in the direction A. As shown in FIG. 12B, deformable solid structure 1210 changes shape while maintaining substantially the same mass center as deformable solid structure 1210 rotates around the circle, changing from the shape shown in structure 1210A to the shape shown in structure 1210B and then back to the shape shown in structure 1210A.

FIG. 12C shows the shape of deformable solid structure 1210 when tilted and accelerated. As shown in FIG. 12C, deformable solid structure 1210 changes shape while maintaining substantially the same mass center as deformable solid structure 1210 rotates around the circle, changing from the shape shown in structure 1210A to the shape shown in structure 1210B and then back to the shape shown in structure 1210A.

In each case, as the shape of deformable solid structure 1210 changes in response to the movement of orientation sensor 1000, the magnetic permeability across the tops of the coils 212C changes which, in turn, changes the inductance and the voltage across the coils 212C. Thus, by measuring the change in voltage across the coils 212C, the movement of orientation sensor 1000 can be determined.

In addition, although orientation sensor 1000 is shown with deformable solid structure 1210 and liquid ferrofluid 140, which allows additional measurements to be made as the liquid ferrofluid 140 moves, orientation sensor 1000 can alternately be implemented with DC-biased sensor circuits that generate magnetic fields that are strong enough to completely change the measure of ferrofluid 140 into a solid state.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. An orientation sensor comprising:
a die having a top surface and a bottom surface;
a body attached to the die, the body having an opening that exposes the top surface of the die;
a measure of ferrofluid positioned in the opening to touch the body and the top surface of the die; and
a top attached to the body to cover the opening.

2. The orientation sensor of claim 1 and further comprising a lead frame attached to the bottom surface of the die.

3. The orientation sensor of claim 2 and further comprising bonding wires that touch the lead frame and the die.

4. The orientation sensor of claim 3 wherein the body encapsulates the bonding wires.

5. The orientation sensor of claim 1 wherein the die includes:
a substrate;
a sensor structure touching the substrate;
a metal interconnect structure touching the substrate and the sensor structure; and a detection structure touching the metal interconnect structure, the measure of ferrofluid touching a top surface of the detection structure.

6. The orientation sensor of claim 5 wherein the detection structure includes:
   an isolation structure touching the measure of ferrofluid; and
   a plurality of coils touching the isolation structure and lying below the measure of ferrofluid, the plurality of coils being spaced apart.

7. The orientation sensor of claim 6 wherein the measure of ferrofluid does not fill up the opening.

8. The orientation sensor of claim 6 wherein the measure of ferrofluid is continuously free flowing.

9. The orientation sensor of claim 6 wherein the measure of ferrofluid includes a deformable solid structure and liquid ferrofluid.

10. The orientation sensor of claim 6 wherein the detection structure include a plurality of magnetic core structures, each coil lying over a magnetic core structure.

11. A method of forming an orientation sensor comprising:
    forming a die having a top surface and a bottom surface;
    attaching a body to the die, the body having an opening that exposes the top surface of the die;
    placing a measure of ferrofluid in the opening to touch the body and the top surface of the die; and
    attaching a top to the body to cover the opening.

12. The method of claim 11 and further comprising attaching a lead frame to the bottom surface of the die.

13. The method of claim 12 and further comprising attaching bonding wires to the lead frame and the die.

14. The method of claim 13 wherein the body encapsulates the bonding wires.

15. The method of claim 11 wherein the die includes:
    a substrate;
    a sensor structure touching the substrate;
    a metal interconnect structure touching the substrate and the sensor structure; and
    a detection structure touching the metal interconnect structure, the measure of ferrofluid touching a top surface of the detection structure.

16. The method of claim 15 wherein the detection structure includes:
    an isolation structure touching the measure of ferrofluid; and
    a plurality of coils touching the isolation structure and lying below the measure of ferrofluid, the plurality of coils being spaced apart.

17. The method of claim 16 wherein the measure of ferrofluid does not fill up the opening.

18. The method of claim 16 wherein the measure of ferrofluid is continuously free flowing.

19. The method of claim 16 wherein the measure of ferrofluid includes a deformable solid structure and liquid ferrofluid.

20. The method of claim 16 wherein the detection structure include a plurality of magnetic core structures, each coil lying over a magnetic core structure.

* * * * *